(12) United States Patent
Tamrakar et al.

(10) Patent No.: US 11,949,620 B2
(45) Date of Patent: Apr. 2, 2024

(54) SIGNAL PROCESSING METHOD AND DEVICE

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Xin Su, Beijing (CN); Hui Li, Beijing (CN); Qiuping Huang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 66 days.

(21) Appl. No.: 16/496,698

(22) PCT Filed: Mar. 14, 2018

(86) PCT No.: PCT/CN2018/078986
§ 371 (c)(1),
(2) Date: Sep. 23, 2019

(87) PCT Pub. No.: WO2018/171477
PCT Pub. Date: Sep. 27, 2018

(65) Prior Publication Data
US 2020/0036495 A1  Jan. 30, 2020

(30) Foreign Application Priority Data
Mar. 22, 2017 (CN) .......................... 201710172854.1

(51) Int. Cl.
*H04L 5/00* (2006.01)
*H04W 72/044* (2023.01)
(Continued)

(52) U.S. Cl.
CPC ......... *H04L 5/0051* (2013.01); *H04W 72/046* (2013.01); *H04W 72/1268* (2013.01); *H04W 72/23* (2023.01)

(58) Field of Classification Search
None
See application file for complete search history.

(56) References Cited

U.S. PATENT DOCUMENTS

2011/0002282 A1\* 1/2011 Inoue ...................... H04L 5/006
370/329
2011/0058505 A1 3/2011 Pan et al.
(Continued)

FOREIGN PATENT DOCUMENTS

| CN | 101572896 A | 11/2009 |
|---|---|---|
| CN | 103036663 A | 4/2013 |

(Continued)

OTHER PUBLICATIONS

R1-1702447, LG electronics, "Discussion on codebook based transmission for UL in NR", Feb. 2017. (Year: 2017).\*
(Continued)

*Primary Examiner* — Jutai Kao
(74) *Attorney, Agent, or Firm* — Harness, Dickey & Pierce, P.L.C.

(57) ABSTRACT

A signal processing method and device are provided. The method includes indicating a first uplink sounding reference signal resource to a terminal, wherein the first uplink sounding reference signal resource is used for uplink beam scanning; receiving a uplink sounding reference signal transmitted by the terminal by using the first uplink sounding reference signal resource; determining a target uplink sounding reference signal based on the uplink sounding reference signal transmitted by the terminal, and transmitting an identifier of the target uplink sounding reference signal to the terminal; indicating a second uplink sounding reference (Continued)

signal resource to the terminal, the second uplink sounding reference signal resource being used to cause the terminal to transmit an uplink sounding reference signal for channel measurement based on the identifier of the target uplink sounding reference signal and the second uplink sounding reference signal resource.

14 Claims, 4 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2012/0281582 A1* | 11/2012 | Yang | H04B 17/327 370/252 |
| 2014/0241242 A1 | 8/2014 | Josiam et al. | |
| 2015/0009951 A1 | 1/2015 | Josiam et al. | |
| 2015/0280796 A1 | 10/2015 | Yen | |
| 2015/0350942 A1 | 12/2015 | Wei et al. | |
| 2016/0127919 A1 | 5/2016 | Hui et al. | |
| 2017/0317866 A1* | 11/2017 | Stirling-Gallacher | H04B 7/0695 |
| 2018/0206132 A1* | 7/2018 | Guo | H04W 72/0473 |
| 2019/0174466 A1* | 6/2019 | Zhang | H04L 5/0048 |
| 2019/0207731 A1* | 7/2019 | Park | H04B 7/0628 |
| 2019/0312705 A1* | 10/2019 | Takano | H04B 7/0413 |
| 2020/0044721 A1* | 2/2020 | Choi | H04L 5/0053 |
| 2021/0135808 A1* | 5/2021 | Choi | H04B 7/0695 |
| 2021/0136748 A1* | 5/2021 | Choi | H04B 7/06 |

FOREIGN PATENT DOCUMENTS

| | | |
|---|---|---|
| CN | 104955061 A | 9/2015 |
| CN | 105103261 A | 11/2015 |
| TW | 201433189 A | 8/2014 |
| TW | 201538002 A | 10/2015 |
| WO | 2016153405 A1 | 9/2016 |

OTHER PUBLICATIONS

Japan Patent Office, Notice of Reasons for Refusal, Japanese Patent Application No. 2019-552062, Date of Drafting: Jan. 20, 2021, Applicant: China Academy of Telecommunications Technology.

Korean Intellectual Property Office, Notification of Reason for Refusal, Korean Patent Application No. 10-2019-7030362, dated Dec. 18, 2020, Applicant: China Academy of Telecommunications Technology.

3GPP TSG RAN WG1 Meeting #88bis, R1-1610273, Lisbon, Portugal, Oct. 10-14, 2016, Agenda Item: 8.1.4.4, Source: Nokia, Alcatel-Lucent Shanghai Bell, Title: UL SRS Design Considerations in NR, Document for: Discussion and Decision.

3GPP TSG RAN WG1 NR Ad-Hoc Meeting, R1-1700486, Spokane, U.S.A., Jan. 16-20, 2017, Agenda Item: 5.1.2.3.4, Source: LG Electronics, Title: Considerations on NR SRS Design, Document for: Discussion and Decision.

3GPP TSG RAN WG1 Meeting #88, R1-1701699, Athens, Greece, Feb. 13-17, 2017, Agenda Item: 8.1.2.4.4, Source: Huawei, HiSilicon, Title: UL SRS Design for CSI Acquisition and Beam Management, Document for: Discussion and Decision.

3GPP TSG RAN WG1 Meeting #88, R1-1702447, Athens, Greece, Feb. 13-17, 2017, Agenda Item: 8.1.2.1.3, Source: LG Electronics, Title: Discussion on codebook based transmission for UL in NR, Document for: Discussion/Decision.

European Patent Office, European Search Report, Communication, dated Dec. 2, 2020, PCT/CN2018078986, China Academy of Telecommunications Technology.

Patent Cooperation Treaty, Written Opinion, International Search Report, dated Oct. 3, 2019, PCT/CN2018/078986, China Academy of Telecommunications Technology.

Text of the Notification of the First Office Action, Patent Application No. 107109566.

Korean Office Action dated Jul. 1, 2022 for Korean Application No. 10-2019-7030362.

LG Electronics , et al, "WF on control signaling for UL-MIMO", 3GPP TSG RAN1 NR Ad-Hoc, R1-1703753, Agenda Item 8.1.2.1.3, Feb. 13-17, 2017, Athens, Greece.

Notice of Reasons for Refusal dated Jun. 6, 2023 in Japanese Application No. 2022-100630.

Samsung, "NR-SRS design for UL beam management," 3GPP TSG RAN WG1 Meeting #88, R1-1702940,. Feb. 17, 2017.

* cited by examiner

SIGNAL PROCESSING METHOD AND DEVICE

CROSS-REFERENCE TO RELATED APPLICATION

The present application is a U.S. national phase application of a PCT Application No. PCT/CN2018/078986 filed on Mar. 14, 2018, which claims a priority to a Chinese patent application No. 201710172854.1 filed in China on Mar. 22, 2017, the present disclosure of which is incorporated in its entirety by reference herein.

TECHNICAL FIELD

The present disclosure relates to the field of communication technology, and in particular relates to a signal processing method and a signal processing device.

BACKGROUND

In a massive antenna system, the number of transmission antennas and reception antennas in a base station and in a terminal is very large. Since the number of the antennas is larger, structures of the antennas are diversified.

Two examples of the structures of the antennas in the terminal are shown in FIG. 1 and FIG. 2. The terminal has two antenna modules; each of the antenna modules may generate an independent analog beam, and may also correspond to a plurality of digital ports. For example, if two digital ports are mapped to each of the antenna modules, then a total of four digital ports are mapped to the two antenna modules. An analog-digital hybrid antenna may generate analog beams and digital beams, one analog beam may only be transmitted in one direction at a time point, and one analog beam may contain multiple digital beams (or digital ports). Because the number of antennas is larger, a generated beam is narrow and the analog beam may only be transmitted in one direction at a time point. In order to achieve a coverage for a cell, the terminal needs to transmit uplink sounding reference signals (i.e., beam scanning) in different analog beam directions in turn.

In a Long Term Evolution (LTE) system, since analog and digital beams are not distinguished, port through which the terminal transmits the uplink sounding reference signals may be configured according to capability of the terminal. The ports are all digital ports. However, in a New Radio (NR) system, especially for a massive antenna, a method of configuring and transmitting an uplink sounding reference signal is not provided yet, thus causing an influence on communication between the terminal and a network side.

SUMMARY

In view of the above, some embodiments of the present disclosure provide a signal processing method, a signal processing device, a computer-readable storage medium, and an electronic device, so as to implement configuration and transmission of an uplink sounding reference signal in an NR system and ensure normal communication between a terminal and a network side.

To address the above technical problems, some embodiments of the present disclosure provide a signal processing method. The signal processing module includes: indicating a first uplink sounding reference signal resource to a terminal, wherein the first uplink sounding reference signal resource is used for uplink beam scanning; receiving an uplink sounding reference signal transmitted by the terminal by using the first uplink sounding reference signal resource; determining a target uplink sounding reference signal based on the uplink sounding reference signal transmitted by the terminal, and transmitting an identifier of the target uplink sounding reference signal to the terminal; indicating a second uplink sounding reference signal resource to the terminal, the second uplink sounding reference signal resource being used to cause the terminal to transmit an uplink sounding reference signal for channel measurement based on the identifier of the target uplink sounding reference signal and the second uplink sounding reference signal resource.

In some optional embodiments, indicating the first uplink sounding reference signal resource to the terminal, includes: configuring the first uplink sounding reference signal resource for the terminal, wherein the first uplink sounding reference signal resource includes M uplink sounding reference signal resources, or the first uplink sounding reference signal resource includes an uplink sounding reference signal resource, wherein the uplink sounding reference signal resource includes M ports; M is an integer larger than 0; indicating the first uplink sounding reference signal resource to the terminal through explicit signaling or implicit signaling.

In some optional embodiments, determining the target uplink sounding reference signal based on the uplink sounding reference signal transmitted by the terminal, includes: selecting, from the uplink sounding reference signal transmitted by the terminal, one or more uplink sounding reference signals having signal qualities meeting a predetermined requirement; taking the one or more uplink sounding reference signal as the target uplink sounding reference signal.

In some optional embodiments, indicating the second uplink sounding reference signal resource to the terminal, includes: configuring the second uplink sounding reference signal resource for the terminal, wherein a quantity N of the second uplink sounding reference signal resource is an integer larger than or equal to 0; indicating the second uplink sounding reference signal resource to the terminal through explicit signaling or implicit signaling.

In some optional embodiments, the method further includes: transmitting corresponding-relation indication information to the terminal, wherein the corresponding-relation indication information includes a corresponding relation between the second uplink sounding reference signal resource and an identifier of the target uplink sounding reference signal; or pre-agreeing the corresponding relation between the second uplink sounding reference signal resource and the identifier of the target uplink sounding reference signal with the terminal.

In some optional embodiments, the method further includes: receiving an uplink sounding reference signal for channel measurement transmitted by the terminal, and performing channel measurement based on the uplink sounding reference signal for channel measurement.

In a second aspect, some embodiments of the present disclosure provide a signal processing method. The signal processing method includes acquiring a first uplink sounding reference signal resource indicated by a network side, wherein the first uplink sounding reference signal resource is used for uplink beam scanning; transmitting an uplink sounding reference signal to the network side by using the first uplink sounding reference signal resource; receiving an identifier of a target uplink sounding reference signal transmitted by the network side; acquiring a second uplink sounding reference signal resource indicated by the network side, and transmitting an uplink sounding reference signal for channel measurement based on the second uplink sounding reference signal resource and the identifier of the target uplink sounding reference signal.

In some optional embodiments, acquiring the first uplink sounding reference signal resource indicated by the network side, includes: acquiring the first uplink sounding reference signal resource indicated by the network side, based on signaling from the network side or a pre-agreement with the network side.

In some optional embodiments, acquiring the second uplink sounding reference signal resource indicated by the network side, includes: acquiring the second uplink sounding reference signal resource indicated by the network side, based on signaling from the network side or a pre-agreement with the network side, wherein a quantity N of the second uplink sounding reference signal resource is an integer larger than or equal to 0.

In some optional embodiments, transmitting the uplink sounding reference signal for channel measurement based on the second uplink sounding reference signal resource and the identifier of the target uplink sounding reference signal, includes: determining a corresponding relation between each identifier of the identifier of the target uplink sounding reference signal and N second uplink sounding reference signal resources; selecting, from the N second uplink sounding reference signal resources based on the corresponding relation, one or more second target uplink sounding reference signal resources corresponding to a first identifier of the identifier of the target uplink sounding reference signal; transmitting the one or more second target uplink sounding reference signal resources in a beam direction corresponding to the first identifier.

In some optional embodiments, determining the corresponding relation between each identifier of the identifier of the target uplink sounding reference signal and the N second uplink sounding reference signal resources, includes: receiving corresponding-relation indication information transmitted by the network side, and based on the corresponding-relation indication information, determining the corresponding relation between each identifier of the identifier of the target uplink sounding reference signal and the N second uplink sounding reference signal resources; or determining the corresponding relation between each identifier of the identifier of the target uplink sounding reference signal and the N second uplink sounding reference signal resources based on a pre-agreement with the network side.

In a third aspect, some embodiments of the present disclosure provide a signal processing device. The signal processing device includes a first indication module, configured to indicate a first uplink sounding reference signal resource to a terminal, wherein the first uplink sounding reference signal resource is used for uplink beam scanning; a first reception module, configured to receive an uplink sounding reference signal transmitted by the terminal by using the first uplink sounding reference signal resource; a determination module, configured to determine a target uplink sounding reference signal based on the uplink sounding reference signal transmitted by the terminal, and transmit an identifier of the target uplink sounding reference signal to the terminal; a first indication module, configured to indicate a second uplink sounding reference signal resource to the terminal, the second uplink sounding reference signal resource being used to cause the terminal to transmit an uplink sounding reference signal for channel measurement based on the identifier of the target uplink sounding reference signal and the second uplink sounding reference signal resource.

In some optional embodiments, the first indication module includes: a first configuration submodule, configured to configure the first uplink sounding reference signal resource for the terminal, wherein the first uplink sounding reference signal resource includes M uplink sounding reference signal resources, or the first uplink sounding reference signal resource includes an uplink sounding reference signal resource, wherein the uplink sounding reference signal resource includes M ports; M is an integer larger than 0; an indication submodule, configured to indicate the first uplink sounding reference signal resource to the terminal through explicit signaling or implicit signaling.

In some optional embodiments, the determination module includes: a selection submodule, configured to select, from the uplink sounding reference signal transmitted by the terminal, one or more uplink sounding reference signals having signal qualities meeting a predetermined requirement; a determination submodule, configured to take the one or more uplink sounding reference signal as the target uplink sounding reference signal.

In some optional embodiments, the second indication module includes: a second configuration submodule, configured to configure the second uplink sounding reference signal resource for the terminal, wherein a quantity N of the second uplink sounding reference signal resource is an integer larger than or equal to 0; a second indication submodule, configured to indicate the second uplink sounding reference signal resource to the terminal through explicit signaling or implicit signaling.

In some optional embodiments, the device further includes a processing module, wherein the processing module is configured to: transmit corresponding-relation indication information to the terminal, wherein the corresponding-relation indication information includes a corresponding relation between the second uplink sounding reference signal resource and an identifier of the target uplink sounding reference signal; or pre-agree the corresponding relation between the second uplink sounding reference signal resource and the identifier of the target uplink sounding reference signal with the terminal.

In some optional embodiments, the device further includes: a channel measurement module, configured to receive the uplink sounding reference signal for channel measurement transmitted by the terminal, and perform channel measurement based on the uplink sounding reference signal for channel measurement.

In a fourth aspect, some embodiments of the present disclosure provide a signal processing device. The signal processing device includes an acquisition module, configured to acquire a first uplink sounding reference signal resource indicated by a network side, wherein the first uplink sounding reference signal resource is used for uplink beam scanning; a transmission module, configured to transmit an uplink sounding reference signal to the network side by using the first uplink sounding reference signal resource; a reception module, configured to receive an identifier of a target uplink sounding reference signal transmitted by the network side; a processing module, configured to acquire a second uplink sounding reference signal resource indicated by the network side, and transmit an uplink sounding reference signal for channel measurement based on the second uplink sounding reference signal resource and the identifier of the target uplink sounding reference signal.

In some optional embodiments, the acquisition module is specifically configured to: acquire the first uplink sounding reference signal resource indicated by the network side, based on signaling from the network side or a pre-agreement with the network side.

In some optional embodiments, the processing module includes: an acquisition submodule, configured to acquire the second uplink sounding reference signal resource indicated by the network side; a processing submodule, configured to transmit the uplink sounding reference signal for channel measurement based on the second uplink sounding reference signal resource and the identifier of the target uplink sounding reference signal.

In some optional embodiments, the acquisition submodule is specifically configured to: acquire the second uplink sounding reference signal resource indicated by the network side, based on signaling from the network side or a pre-agreement with the network side, wherein a quantity N of the second uplink sounding reference signal resource is an integer larger than or equal to 0.

In some optional embodiments, the processing submodule includes: a determination unit, configured to determine a corresponding relation between each identifier of the identifier of the target uplink sounding reference signal and N second uplink sounding reference signal resources; a selection unit, configured to select, from the N second uplink sounding reference signal resources based on the corresponding relation, one or more second target uplink sounding reference signal resources corresponding to a first identifier of the identifier of the target uplink sounding reference signal; a transmission unit, configured to transmit the one or more second target uplink sounding reference signal resources in a beam direction corresponding to the first identifier.

In some optional embodiments, the determination unit is specifically configured to: receive corresponding-relation indication information transmitted by the network side, and based on the corresponding-relation indication information, determine the corresponding relation between each identifier of the identifier of the target uplink sounding reference signal and the N second uplink sounding reference signal resources; or determine the corresponding relation between each identifier of the identifier of the target uplink sounding reference signal and the N second uplink sounding reference signal resources based on a pre-agreement with the network side.

In a fifth aspect, some embodiments of the present disclosure provide an electronic device. The electronic apparatus includes a housing, a processor, a storage, an electronic board, a power supply circuit. The electronic board is arranged inside a space enclosed by the housing, the processor and the storage are arranged on the electronic board. The power supply circuit is configured to supply power for various electronic circuits or devices in the electronic apparatus. The storage is configured to store executable programs and codes. The processor is configured to read the executable programs and codes stored in the storage to execute a program corresponding to the executable programs and codes so as to perform the signal processing method according to the above.

In a sixth aspect, some embodiments of the present disclosure provide a computer readable storage medium. The computer readable storage medium is configured to storage a computer program, wherein the computer program is executable by the processor to execute the signal processing method according to the above.

In a seventh aspect, some embodiments of the present disclosure provide a base station. The base station includes a storage, a processor, and a transceiver, wherein, the processor is configured to read a program in the storage and execute following steps: indicating a first uplink sounding reference signal resource to a terminal, wherein the first uplink sounding reference signal resource is used for uplink beam scanning; receiving a uplink sounding reference signal transmitted by the terminal by using the first uplink sounding reference signal resource; determining a target uplink sounding reference signal based on the uplink sounding reference signal transmitted by the terminal, and transmitting an identifier of the target uplink sounding reference signal to the terminal; indicating a second uplink sounding reference signal resource to the terminal, the second uplink sounding reference signal resource being used to cause the terminal to transmit an uplink sounding reference signal for channel measurement based on the identifier of the target uplink sounding reference signal and the second uplink sounding reference signal resource; wherein the transceiver is configured to receive and transmit data.

In an eighth aspect, some embodiments of the present disclosure provide a terminal. The terminal includes a storage, a processor, and a transceiver, wherein, the processor is configured to read a program in the storage and execute following steps: acquiring a first uplink sounding reference signal resource indicated by a network side, wherein the first uplink sounding reference signal resource is used for uplink beam scanning; transmitting an uplink sounding reference signal to the network side by using the first uplink sounding reference signal resource; receiving an identifier of a target uplink sounding reference signal transmitted by the network side; acquiring a second uplink sounding reference signal resource indicated by the network side, and transmitting an uplink sounding reference signal for channel measurement based on the second uplink sounding reference signal resource and the identifier of the target uplink sounding reference signal; wherein the transceiver is configured to receive and transmit data.

Advantageous effects of the above technical solutions of the present disclosure are as follow: in the embodiments of the present disclosure, by indicating to the terminal the first uplink sounding reference signal resource for uplink beam scanning and the second uplink sounding reference signal resource for channel measurement, the terminal may transmit the uplink sounding reference signal so that channel measurement may be performed and normal communication between the terminal and the network side may be ensured.

DETAILED DESCRIPTION

The present disclosure will now be described in further detail with reference to accompanying drawings and embodiments. The following embodiments are used to illustrate the present disclosure, but are not intended to limit the scope of the present disclosure.

Figure 1A:
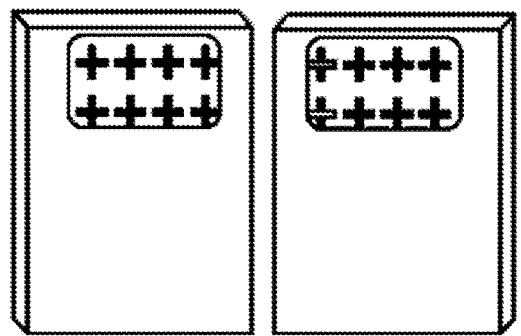
FIG. 1(a) and FIG. 1(b) are schematic diagrams of a structure of an antenna of a terminal in the related art.
Figure 1B:
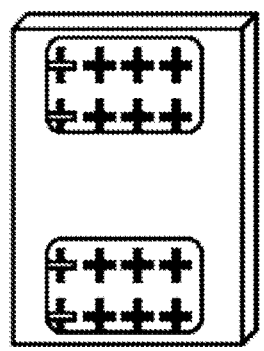
Figure 2:
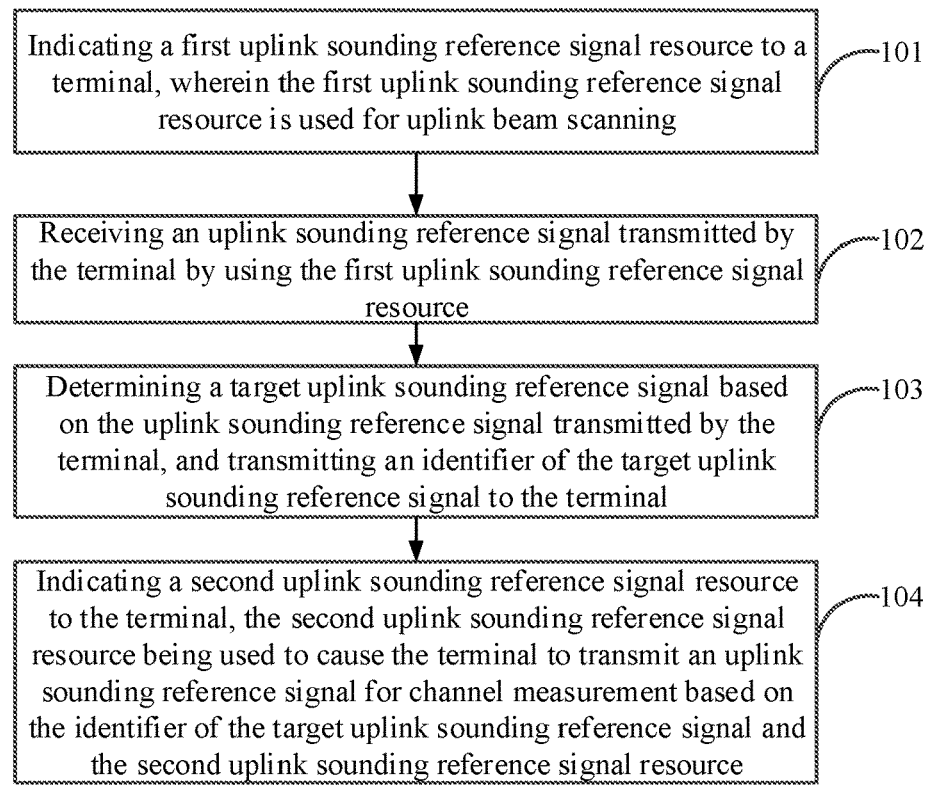
FIG. 2 is a flowchart of a signal processing method according to some embodiments of the present disclosure.

As shown in FIG. 2, a signal processing method in the embodiments of the present disclosure is applied to a network side device, such as a base station. The signal processing method includes following steps 101-104.

Step 101: indicating one or more first uplink sounding reference signal resources to a terminal, wherein the one or more first uplink sounding reference signal resources are used for uplink beam scanning.

In this step, the network side device may configure one or more first uplink sounding reference signal resources for the terminal, wherein the one or more first uplink sounding reference signal resources include M uplink sounding reference signal resources, or the one or more first uplink sounding reference signal resources include an uplink sounding reference signal resource, wherein the uplink sounding reference signal resource includes M ports; M is an integer larger than 0. After the one or more first uplink sounding reference signals resource are configured, the one or more first uplink sounding reference signal resources may be indicated to the terminal through explicit signaling or implicit signaling.

Step 102: receiving one or more uplink sounding reference signals transmitted by the terminal by using the one or more first uplink sounding reference signal resources.

Specifically, one or more uplink sounding reference signals (such as SRS) transmitted respectively in M uplink beam directions by the terminal are received.

Step 103: determining one or more target uplink sounding reference signals based on the one or more uplink sounding reference signals transmitted by the terminal, and transmitting one or more identifiers of the one or more target uplink sounding reference signals to the terminal.

In this step, signal qualities of the one or more uplink sounding reference signals may be calculated separately, and then one or more uplink sounding reference signals whose signal qualities meets a predetermined requirement may be selected as the one or more target uplink sounding reference signals.

Step 104: indicating one or more second uplink sounding reference signal resources to the terminal, the one or more second uplink sounding reference signal resources being used to cause the terminal to transmit one or more uplink sounding reference signals used for channel measurement based on the one or more identifiers of the one or more target uplink sounding reference signals and the one or more second uplink sounding reference signal resources.

In this step, the one or more second uplink sounding reference signal resources are configured for the terminal, wherein the number N of the one or more second uplink sounding reference signal resources is an integer larger than or equal to 0. After the one or more second uplink sounding reference signal resources are configured, the one or more second uplink sounding reference signal resources are indicated to the terminal through explicit signaling or implicit signaling.

In the embodiments of the present disclosure, through indicating to the terminal the one or more first uplink sounding reference signal resources for uplink beam scanning and the one or more second uplink sounding reference signal resources for channel measurement, the terminal may transmit the one or more uplink sounding reference signals, so that the channel measurement is performed to ensure normal communication between the terminal and the network side.

Figure 3:
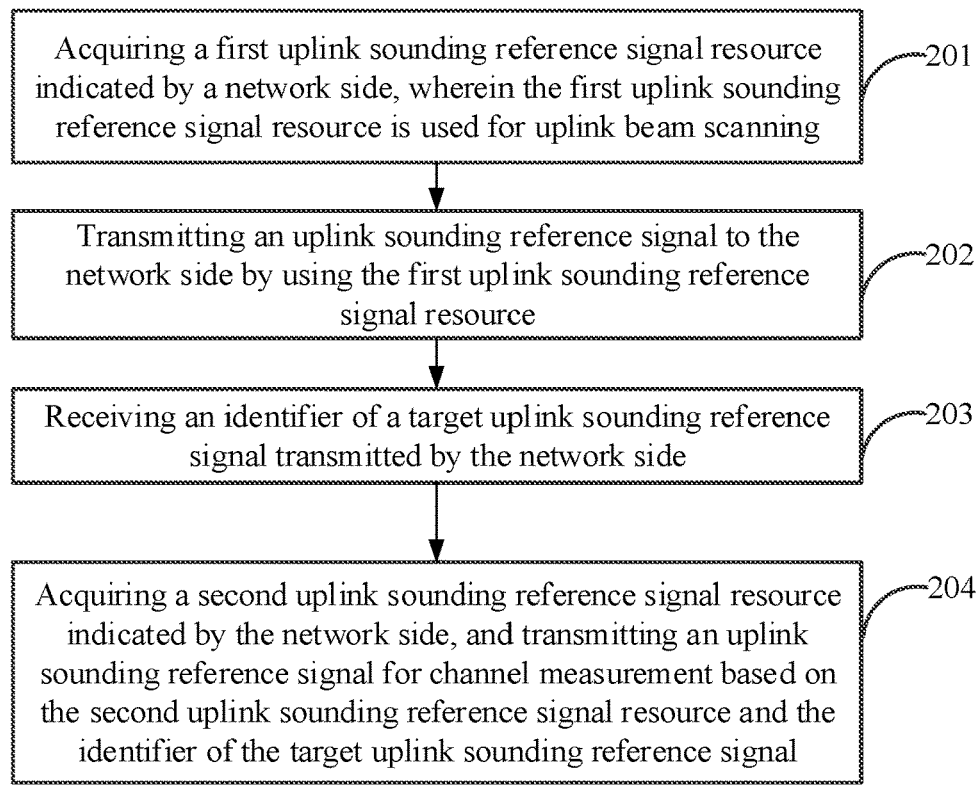
FIG. 3 is a flowchart of a signal processing method according to some embodiments of the present disclosure.

As shown in FIG. 3, a signal processing method in the embodiments of the present disclosure is applied to a terminal. The terminal includes steps 201-204.

Step 201: acquiring one or more first uplink sounding reference signal resources indicated by a network side, wherein the one or more first uplink sounding reference signal resources are used for uplink beam scanning.

In the embodiments of the present disclosure, the one or more first uplink sounding reference signal resources indicated by the network side may be acquired based on signaling from the network side or a pre-agreement between the terminal and the network side.

Step 202: transmitting one or more uplink sounding reference signals to the network side by using the one or more first uplink sounding reference signal resources.

Step 203: receiving one or more identifiers of one or more target uplink sounding reference signals transmitted by the network side.

Step 204: acquiring one or more second uplink sounding reference signal resources indicated by the network side, and transmitting one or more uplink sounding reference signals for channel measurement based on the one or more second uplink sounding reference signal resources and the one or more identifiers of the one or more target uplink sounding reference signals.

In the embodiments of the present disclosure, the one or more second uplink sounding reference signal resources indicated by the network side are acquired based on the signaling from the network side or the pre-agreement between the terminal and the network side, wherein the number N of the one or more second uplink sounding reference signal resources is an integer larger than or equal to 0.

Specifically, when the one or more uplink sounding reference signals for channel measurement are transmitted, based on an indication from the network side or based on the pre-agreement between the terminal and the network side, one or more corresponding relations between the one or more identifiers in the one or more identifiers of the one or more target uplink sounding reference signals and the N second uplink sounding reference signal resources are determined. One or more second target uplink sounding reference signal resources corresponding to a first identifier in the one or more identifiers of the one or more target uplink sounding reference signals are selected from the N second uplink sounding reference signal resources based on the corresponding relations. The one or more second target uplink sounding reference signal resources in a beam direction corresponding to the first identifier are transmitted. The first identifier may be any one of the one or more identifiers.

In the embodiments of the present disclosure, by indicating to the terminal the one or more first uplink sounding reference signal resources for uplink beam scanning and the one or more second uplink sounding reference signal resources for channel measurement, the terminal may transmit the one or more uplink sounding reference signals so that channel measurement may be performed to ensure normal communication between the terminal and the network side.

In the embodiments of the present disclosure, the base station configures two levels of uplink sounding reference signals (such as SRS) to the terminal, wherein the first level of the uplink sounding reference signals (such as SRS) is used to instruct the terminal to transmit the uplink sounding reference signals (such as SRS) on different analog beams. The second level of uplink sounding reference signals (such as SRS) is used to indicate the terminal to acquire channel information after the terminal determines the analog beams, i.e., for sake of performing the channel measurement. How the base station configures the uplink sounding reference signals (such as SRS) and a transmission behavior of the terminal is described in detail below.

Figure 4:
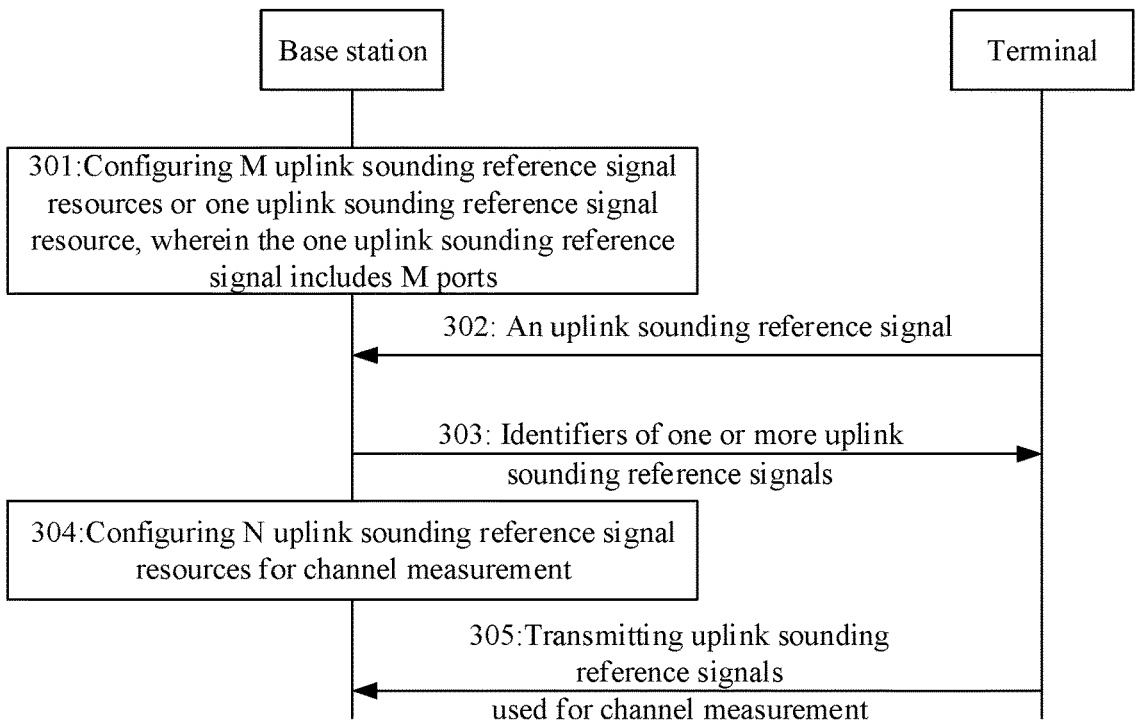
FIG. 4 is a flowchart of a signal processing method according to some embodiments of the present disclosure.

As shown in FIG. 4, the signal processing method of the embodiments of the present disclosure includes steps 301-305.

Step 301: configuring, by the base station, M uplink sounding reference signal (such as SRS) resources or one uplink sounding reference signal resource for the terminal, wherein the one uplink sounding reference signal includes M ports for uplink beam scanning.

After the configuration is completed, the base station may indicate to the terminal through explicit signaling or implicit signaling that the uplink sounding reference signals (such as SRS) or the uplink sounding reference signal is used for uplink beam scanning. The M uplink sounding reference signal (such as SRS) resources or M ports of the one uplink sounding reference signal resource correspond to M uplink beam directions.

Step 302: transmitting, by the terminal, uplink sounding reference signals (such as SRS) in M uplink beam directions, respectively.

Accordingly, the base station receives M uplink sounding reference signal (such as SRS) resources transmitted by the terminal in the M uplink beam directions or receives the one uplink sounding reference signal including M ports.

Step 303: selecting, by the terminal, one or more uplink sounding reference signals having signal qualities meeting a predetermined requirement according to the signal qualities, and indicating, to the terminal, identifiers (SRI) of corresponding one or more uplink sounding reference signals.

For example, the base station may select one or more uplink sounding reference signals having better signal qualities.

Step 304: configuring, by the base station, N uplink sounding reference signal (such as SRS) resources for channel measurement, and indicating to the terminal the N uplink sounding reference signal resources for channel measurement, wherein N is an integer larger than or equal to 0.

Step 305: transmitting, by the terminal, uplink sounding reference signals used for channel measurement according to the identifiers of the one or more uplink sounding reference signals and N uplink sounding reference signal resources for channel measurement.

In the embodiments of the present disclosure, the corresponding relations between the identifiers of one or more uplink sounding reference signals and the N uplink sounding reference signal resources for channel measurement may be indicated by the network side to the terminal through signaling, or may be pre-agreed by the network side and the terminal. If the network side indicates the corresponding relations, the terminal may determine how to transmit the uplink sounding reference signals for channel measurement according to the indication of the network side. If the corresponding relations are pre-agreed with the network side, the terminal may determine how to transmit the uplink sounding reference signals for channel measurement according to the pre-agreement. The corresponding relations may be in forms of one-to-one, one-to-many, many-to-one, many-to-many, or the like.

In this step, based on information transmitted by the base station in steps 304 and 305, the terminal may perform transmission in the following manner:

If the base station indicates an identifier of an uplink sounding reference signal (SRI) and a corresponding uplink sounding reference signal (such as SRS) resource for channel measurement, then the terminal transmits the uplink sounding reference signal (such as SRS) for channel measurement in a beam direction corresponding to the identifier (SRI) of the uplink sounding reference signal.

If the base station does not configure an uplink sounding reference signal (such as SRS) for channel measurement (N=0), then the terminal does not transmit an uplink sounding reference signal (such as SRS) for channel measurement.

If the base station indicates identifiers (SRI) of a plurality of uplink sounding reference signals, the base station configures uplink sounding reference signal (such as SRS) resources for channel measurement and the terminal transmits the uplink sounding reference signals (such as SRS) for channel measurement in following manners.

(1) the base station indicates identifiers (SRI) of N uplink sounding reference signals and P uplink sounding reference signal (such as SRS) resources for channel measurement (N≠P), and the explicit signaling indicates to the terminal which uplink sounding reference signal (such as SRS) resources may be transmitted by the terminal simultaneously (i.e., indicates the corresponding relations between the identifiers of N uplink sounding reference signals and the P uplink sounding reference signal resources for channel measurement), that is, indicates to the terminal that uplink beams corresponding to identifiers (SRI) of which of the plurality of uplink sounding reference signals may be transmitted simultaneously.

In such a case, the terminal may determine, based on the explicit signaling, uplink beams corresponding to identifiers (SRI) of which of the plurality of uplink sounding reference signals may be transmitted simultaneously, and then transmit the corresponding uplink sounding reference signals in the beam directions corresponding to the identifiers.

(2) the base station indicates identifiers (SRI) of N uplink sounding reference signals and an uplink sounding reference signal (such as SRS) resource for channel measurement, that is, beams corresponding to the identifiers of the N uplink sounding reference signals may be transmitted simultaneously.

In such a case, the terminal may simultaneously transmit the uplink sounding reference signals in the beam directions corresponding to the identifiers of the N uplink sounding reference signals according to a pre-agreement.

(3) the base station indicates identifiers (SRI) of N uplink sounding reference signals and corresponding N uplink sounding reference signal (such as SRS) resources for channel measurement, which implicitly means that any uplink sounding reference signal (such as SRS) resource for channel measurement may not be transmitted simultaneously, that is, a beam corresponding to any of the identifiers (SRI) of the uplink sounding reference signals may not be transmitted simultaneously.

In this case, the terminal determines the uplink sounding reference signal for channel measurement corresponding to the identifier of each uplink sounding reference signal, and then transmits the corresponding uplink sounding reference signal in the corresponding beam direction.

For example, the base station indicates two SRIs and configures one uplink sounding reference signal (such as SRS) resource for channel measurement. The terminal simultaneously transmits uplink sounding reference signals in beam directions corresponding to the two SRIs according to a pre-agreement with the base station, and maps a plurality of ports of the uplink sounding reference signal (such as SRS) resource for channel measurement to the two beam directions.

As another example, the base station indicates two SRIs and configures one uplink sounding reference signal (such as SRS) resource for channel measurement, and informs, through signaling, a corresponding relation between a SRI and the uplink sounding reference signal (such as SRS) resource for channel measurement (e.g. SRI 1 corresponds to uplink sounding reference signal resource for channel measurement). The terminal selects an SRI (e.g., selects SRI 1) according to the signaling, and transmits an uplink sounding reference signal (such as SRS) for channel measurement in a beam direction corresponding to the selected SRI.

As still another example, the base station indicates two SRIs and configures two uplink sounding reference signal (such as SRS) resources for channel measurement, and informs, through signaling, corresponding relations between the SRIs and the uplink sounding reference signal (such as SRS) resources for channel measurement (e.g. SRI 1 and SRI 2 respectively correspond to the two uplink sounding reference signal resources for channel measurement). The terminal selects one SRI at one time point according to the signaling, and transmits a corresponding uplink sounding reference signal (such as SRS) for measurement in a beam direction corresponding to the selected SRI.

As another example, the base station indicates two SRIs and configures two uplink sounding reference signal (such as SRS) resources for channel measurement. The terminal selects one SRI at one time point according to a pre-agreement with the base station, and transmits a corresponding uplink sounding reference signal (such as SRS) for channel measurement in a beam direction corresponding to the selected SRI.

As still another example, the base station indicates three SRIs and configures two uplink sounding reference signal (such as SRS) resources for channel measurement, the base station indicates, through signaling, that a SRI 1 and a SRI 2 correspond to a first uplink sounding reference signal for channel measurement, and a SRI 3 corresponds to a second uplink sounding reference signal for channel measurement. The terminal may transmit two beams corresponding to the SRI 1 and the SRI 2 simultaneously at one time point, but may not transmit a beam corresponding to the SRI 3 simultaneously. That is, the terminal simultaneously transmits the first uplink sounding reference signal for channel measurement in the beam directions corresponding to the SRI 1 and the SRI 2, and transmits the second uplink sounding reference signal for channel measurement in the beam direction corresponding to the SRI 3.

Figure 5:
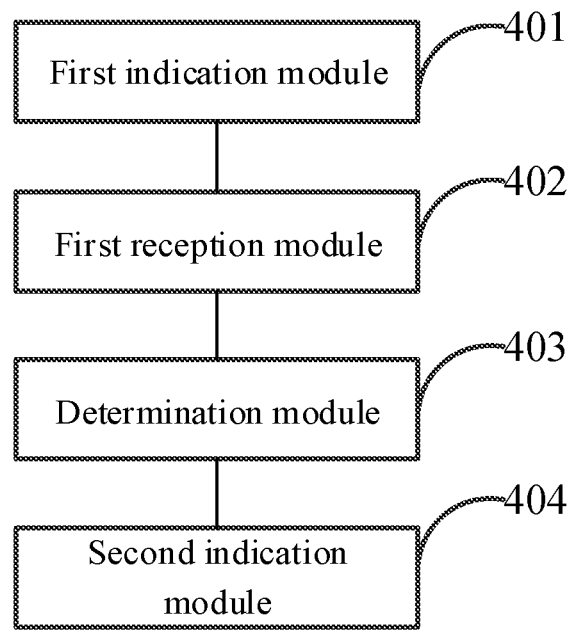
FIG. 5 is a schematic diagram of a signal processing device according to some embodiments of the present disclosure.

As shown in FIG. 5, a signal processing device of the embodiments of the present disclosure includes a first indication module 401, a first reception module 402, a determination module 403, and a second indication module 404.

The first indication module 401 is configured to indicate one or more first uplink sounding reference signal resources to a terminal, wherein the one or more first uplink sounding reference signal resources are used for uplink beam scanning. The first reception module 402 is configured to receive one or more uplink sounding reference signals transmitted by the terminal by using the one or more first uplink sounding reference signal resources. The determination module 403 is configured to determine one or more target uplink sounding reference signals based on the one or more uplink sounding reference signals transmitted by the terminal, and transmit one or more identifiers of the one or more target uplink sounding reference signals to the terminal. The second indication module 404 is configured to indicate one or more second uplink sounding reference signal resources to the terminal, the one or more second uplink sounding reference signal resources being used to cause the terminal to transmit one or more uplink sounding reference signals used for channel measurement based on the one or more identifiers of the one or more target uplink sounding reference signals and the one or more second uplink sounding reference signal resources.

The first indication module 401 includes a first configuration submodule and a first indication submodule.

The first configuration submodule is configured to configure one or more first uplink sounding reference signal resources for the terminal, wherein the one or more first uplink sounding reference signal resources include M uplink sounding reference signal resources, or the one or more first uplink sounding reference signal resources include one uplink sounding reference signal resource, wherein the uplink sounding reference signal resource includes M ports; M is an integer larger than 0. The first indication submodule is configured to indicate to the terminal the one or more first uplink sounding reference signal resources through explicit signaling or implicit signaling.

The determination module 403 includes a selection submodule and a determination submodule. The selection submodule is configured to select one or more uplink sounding reference signals having signal qualities meeting a predetermined requirement, based on uplink sounding reference signals transmitted by the terminal. The determination submodule is configured to take the one or more uplink sounding reference signals as the one or more target uplink sounding reference signals.

The second indication module 404 includes a second configuration submodule and a second indication submodule. The second configuration submodule is configured to configure one or more second uplink sounding reference signal resources for the terminal, wherein the number N of the one or more second uplink sounding reference signal resources is an integer larger than or equal to 0. The second indication submodule is configured to indicate the one or more second uplink sounding reference signal resources to the terminal through explicit signaling or implicit signaling.

Figure 6:
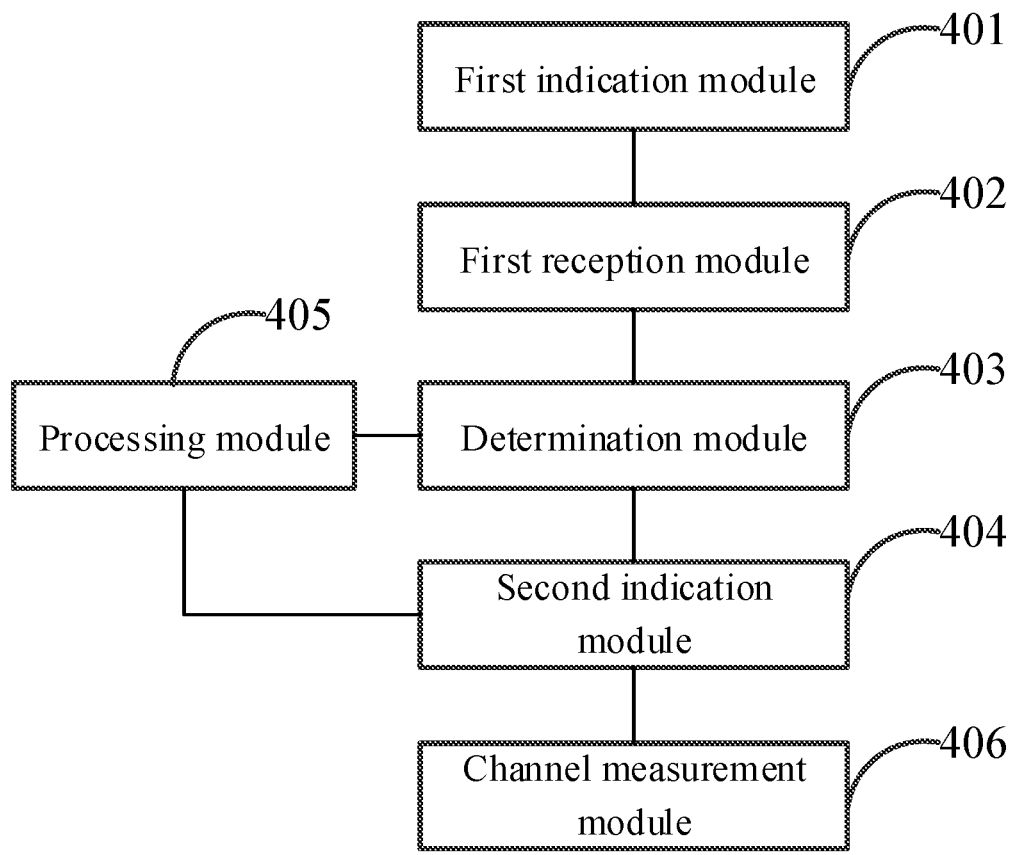
FIG. 6 is a structural diagram of a signal processing device according to some embodiments of the present disclosure.

As shown in FIG. 6, the device further includes a processing module 405 and a channel measurement module 406. The processing module 405 is configured to transmit corresponding-relation indication information to the terminal, wherein the corresponding-relation indication information includes corresponding relations between the one or more second uplink sounding reference signal resources and identifiers of the one or more target uplink sounding reference signals; or is configured to pre-agree corresponding relations between the one or more second uplink sounding reference signal resources and the identifiers of the one or more target uplink sounding reference signals with the terminal. The channel measurement module 406 is configured to receive one or more uplink sounding reference signals for channel measurement transmitted by the terminal, and perform channel measurement based on the one or more uplink sounding reference signals for channel measurement.

An operational principle of the device of the present disclosure may be obtained by referring to foregoing descriptions of the method embodiments, and the device may be located in a base station.

In the embodiments of the present disclosure, through indicating to the terminal the one or more first uplink sounding reference signal resources for uplink beam scanning and the one or more second uplink sounding reference signal resources for channel measurement, the terminal may transmit the one or more uplink sounding reference signals, so that the channel measurement is performed to ensure normal communication between the terminal and the network side.

Figure 7:
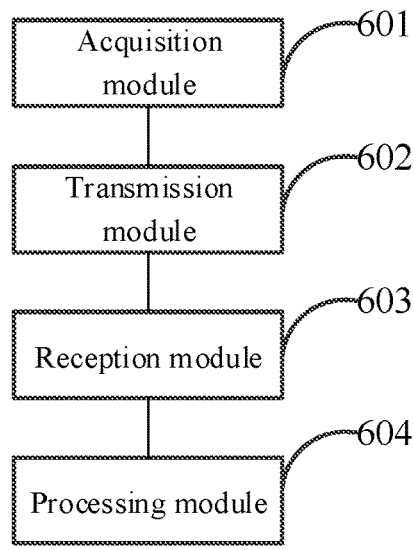
FIG. 7 is another schematic diagram of a signal processing device according to some embodiments of the present disclosure.

As shown in FIG. 7, a signal processing device of the embodiments of the present disclosure includes an acquisition module 601, a transmission module 602, a reception module 603, and a processing module 604.

The acquisition module 601 is configured to acquire one or more first uplink sounding reference signal resources indicated by a network side, wherein the one or more first uplink sounding reference signal resources are used for uplink beam scanning. The transmission module 602 is configured to transmit one or more uplink sounding reference signals to the network side by using the one or more first uplink sounding reference signal resources. The reception module 603 is configured to receive one or more identifiers of one or more target uplink sounding reference signals transmitted by the network side. The processing module 604 is configured to acquire one or more second uplink sounding reference signal resources indicated by the network side, and transmit one or more uplink sounding reference signals for channel measurement based on the one or more second uplink sounding reference signal resources and the one or more identifiers of the one or more target uplink sounding reference signals.

The acquisition module 601 is specifically configured to acquire, based on signaling from the network side or a pre-agreement between the terminal and the network side, the one or more first uplink sounding reference signal resources indicated by the network side.

The processing module 604 includes an acquisition submodule and a processing submodule. The acquisition submodule is configured to acquire the one or more second uplink sounding reference signal resources indicated by the network side. The processing submodule is configured to transmit one or more uplink sounding reference signals for channel measurement based on the one or more second uplink sounding reference signal resources and the identifiers of the one or more target uplink sounding reference signals.

Specifically, the acquisition submodule is specifically configured to acquire, based on the signaling from the network side or the pre-agreement between the terminal and the network side, the one or more second uplink sounding reference signal resources indicated by the network side, wherein the number N of the one or more second uplink sounding reference signal resources is an integer larger than or equal to 0.

The processing submodule includes a determination unit, a selection unit, and a transmission unit. The determination unit is configured to determine corresponding relations between each identifier in the identifiers of the one or more target uplink sounding reference signals and N second uplink sounding reference signal resources. The selection unit is configured to select one or more second target uplink sounding reference signal resources corresponding to a first identifier in the identifiers of the one or more target uplink sounding reference signals from the N second uplink sounding reference signal resources, based on the corresponding relations. The transmission unit is configured to transmit the one or more second target uplink sounding reference signal resources in a beam direction corresponding to the first identifier.

The determination unit is specifically configured to receive corresponding-relation indication information transmitted by the network side, and based on the corresponding-relation indication information, determine corresponding relations between each identifier in the identifiers of the one or more target uplink sounding reference signals and the N second uplink sounding reference signal resources; or is configured to determine corresponding relations between each identifier in the identifiers of the one or more target uplink sounding reference signals and the N second uplink sounding reference signal resources based on a pre-agreement with the network side.

An operational principle of the device of the present disclosure may be obtained by referring to foregoing descriptions of the method embodiments, and the device may be located in a terminal.

In the embodiments of the present disclosure, by indicating to the terminal the one or more first uplink sounding reference signal resources for uplink beam scanning and the one or more second uplink sounding reference signal resources for channel measurement, the terminal may transmit the one or more uplink sounding reference signals so that channel measurement may be performed to ensure normal communication between the terminal and the network side.

The embodiments of the present disclosure further provide a signal processing device. The signal processing device includes a processor and a storage connected to the processor through a bus interface, wherein the storage is configured to store programs and data used by the processor when the processor performs operations, and when the processor calls and executes the programs and data stored in the storage, the processor implements following functional modules or units: a first indication module, configured to indicate one or more first uplink sounding reference signal resources to a terminal, wherein the one or more first uplink sounding reference signal resources are used for uplink beam scanning; a first reception module, configured to receive one or more uplink sounding reference signals transmitted by the terminal by using the one or more first uplink sounding reference signal resources; a determination module, configured to determine one or more target uplink sounding reference signals based on the one or more uplink sounding reference signals transmitted by the terminal, and transmit one or more identifiers of the one or more target uplink sounding reference signals to the terminal; and a second indication module, configured to indicate one or more second uplink sounding reference signal resources to the terminal, the one or more second uplink sounding reference signal resources being used to cause the terminal to transmit one or more uplink sounding reference signals used for channel measurement based on the one or more identifiers of the one or more target uplink sounding reference signals and the one or more second uplink sounding reference signal resources.

The embodiments of the present disclosure further provide a signal processing device. The signal processing device includes a processor and a storage connected to the processor through a bus interface, wherein the storage is configured to store programs and data used by the processor when the processor performs operations, and when the processor calls and executes the programs and data stored in the storage, the processor implements following functional modules or units: an acquisition module, configured to acquire one or more first uplink sounding reference signal resources indicated by a network side, wherein the one or more first uplink sounding reference signal resources are used for uplink beam scanning; a transmission module, configured to transmit one or more uplink sounding reference signals to the network side by using the one or more first uplink sounding reference signal resources; a reception module, configured to receive one or more identifiers of one or more target uplink sounding reference signals transmitted by the network side; a processing module, configured to acquire one or more second uplink sounding reference signal resources indicated by the network side, and transmit one or more uplink sounding reference signals for channel measurement based on the one or more second uplink sounding reference signal resources and the one or more identifiers of the one or more target uplink sounding reference signals.

Figure 8:
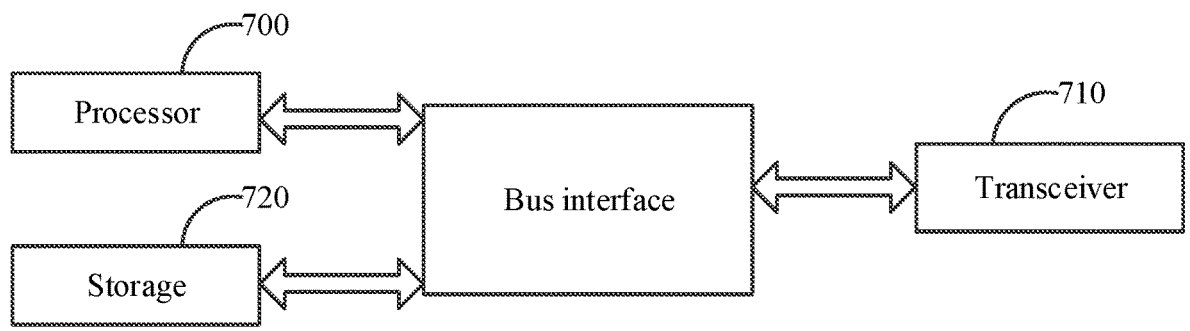
FIG. 8 is a schematic diagram of a base station according to some embodiments of the present disclosure.

As shown in FIG. 8, some embodiments of the present disclosure further provide a base station. The base station includes a storage 720, a processor 700, and a transceiver 710, wherein the processor 700 is configured to read a program in the storage 720 to perform following steps: indicating one or more first uplink sounding reference signal resources to a terminal, wherein the one or more first uplink sounding reference signal resources are used for uplink beam scanning; receiving one or more uplink sounding reference signals transmitted by the terminal by using the one or more first uplink sounding reference signal resources; determining one or more target uplink sounding reference signals based on the one or more uplink sounding reference signals transmitted by the terminal, and transmitting one or more identifiers of the one or more target uplink sounding reference signals to the terminal; indicating one or more second uplink sounding reference signal resources to the terminal, the one or more second uplink sounding reference signal resources being used to cause the terminal to transmit one or more uplink sounding reference signals used for channel measurement based on the one or more identifiers of the one or more target uplink sounding reference signals and the one or more second uplink sounding reference signal resources.

The transceiver 710 is configured to receive data and transmit data under a control of the processor 700.

In FIG. 8, a bus architecture may include any number of interconnected first buses and bridges. Specifically, various circuits including one or more processors such as the processor 700 and a storage such as the storage 720 are linked together. The bus architecture may also link together various other circuits such as peripheral devices, voltage regulators, and power management circuits, etc., which are well known in the art and therefore will not be further described herein. The bus interface provides an interface. The transceiver 710 may be one or more elements such as a plurality of transmitters and a plurality of receivers, configured to provide units for communicating with various other devices over a transmission medium. The processor 700 is responsible for managing the bus architecture and general processing, and the storage 720 may store data used by the processor 700 when the processor 700 performs operations.

The processor 700 is responsible for managing the bus architecture and general processing, and the storage 720 may store data used by the processor 700 when the processor 700 performs an operation.

The processor 700 is further configured to configure one or more first uplink sounding reference signal resources for the terminal, wherein the one or more first uplink sounding reference signal resources include M uplink sounding reference signal resources, or the one or more first uplink sounding reference signal resources include one uplink sounding reference signal resource, wherein the uplink sounding reference signal resource includes M ports; M is an integer larger than 0; or is configured to indicate to the terminal the one or more first uplink sounding reference signal resources through explicit signaling or implicit signaling.

The processor 700 is further configured to select one or more uplink sounding reference signals having signal qualities meeting a predetermined requirement, based on the uplink sounding reference signals transmitted by the terminal; and take the one or more uplink sounding reference signals as the one or more target uplink sounding reference signals.

The processor 700 is further configured to configure one or more second uplink sounding reference signal resources for the terminal, wherein the number N of the one or more second uplink sounding reference signal resources is an integer larger than or equal to 0; and indicate the one or more second uplink sounding reference signal resources to the terminal through explicit signaling or implicit signaling.

The processor 700 is further configured to transmit corresponding relations between the one or more second uplink sounding reference signal resources and identifiers of the one or more target uplink sounding reference signals.

The processor 700 is further configured to receive one or more uplink sounding reference signals for channel measurement transmitted by the terminal, and perform channel measurement based on the one or more uplink sounding reference signals for channel measurement.

In the embodiments of the present disclosure, through indicating to the terminal the one or more first uplink sounding reference signal resources for uplink beam scanning and the one or more second uplink sounding reference signal resources for channel measurement, the terminal may transmit the one or more uplink sounding reference signals, so that the channel measurement is performed to ensure normal communication between the terminal and the network side.

Figure 9:
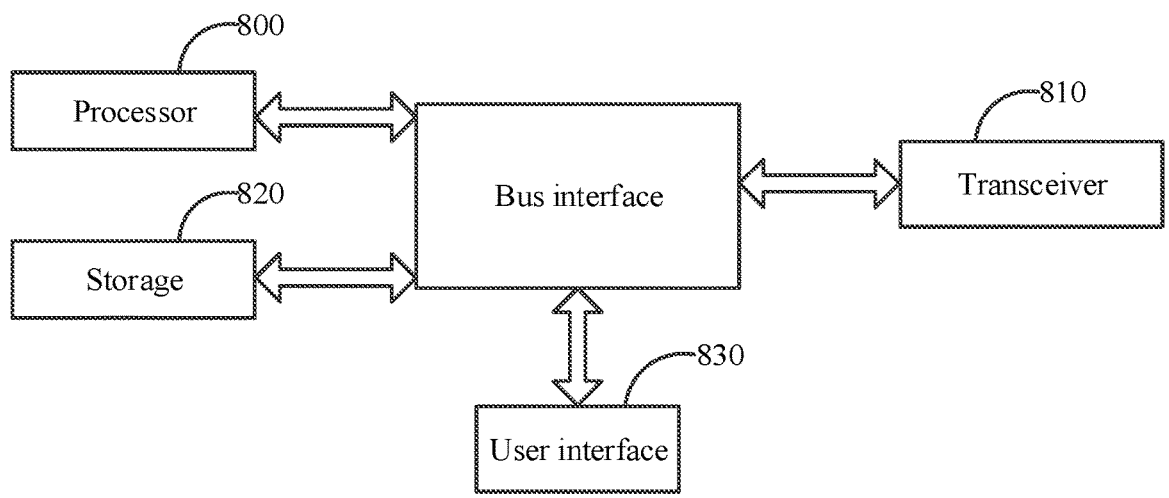
FIG. 9 is a schematic diagram of a terminal according to some embodiments of the present disclosure.

As shown in FIG. 9, some embodiments of the present disclosure further provide a terminal. The terminal includes a storage 820, a transceiver 810, a user interface 830, and a processor 800, wherein the processor 800 is configured to read a program in the storage 820 to perform following steps: acquiring one or more first uplink sounding reference signal resources indicated by a network side, wherein the one or more first uplink sounding reference signal resources are used for uplink beam scanning; transmitting one or more uplink sounding reference signals to the network side by using the one or more first uplink sounding reference signal resources; receiving one or more identifiers of one or more target uplink sounding reference signals transmitted by the network side; and acquiring one or more second uplink sounding reference signal resources indicated by the network side, and transmitting one or more uplink sounding reference signals for channel measurement based on the one or more second uplink sounding reference signal resources and the one or more identifiers of the one or more target uplink sounding reference signals.

The transceiver 810 is configured to receive data and transmit data under a control of the processor 800.

In FIG. 9, a bus architecture may include any number of interconnected first buses and bridges. Specifically, various circuits including one or more processors such as the processor 800 and a storage such as the storage 820 are linked together. The bus architecture may also link together various other circuits such as peripheral devices, voltage regulators, and power management circuits, etc., which are well known in the art and therefore will not be further described herein. The bus interface provides an interface. The transceiver 810 may be one or more elements such as a plurality of transmitters and a plurality of receivers, configured to provide units for communicating with various other devices over a transmission medium. For different user devices, the user interface 830 may also be an interface capable of interfacing with internal or external necessary devices including, but not limited to, a keypad, a display, a speaker, a microphone, a joystick, and the like.

The processor 800 is responsible for managing the bus architecture and general processing, and the storage 820 may store data used by the processor 800 when the processor 800 performs an operation.

The processor 800 is further configured to acquire, based on signaling from the network side or a pre-agreement between the terminal and the network side, the one or more first uplink sounding reference signal resources indicated by the network side.

The processor 800 is further configured to acquire the one or more second uplink sounding reference signal resources indicated by the network side, based on signaling from the network side or the pre-agreement between the terminal and the network side, wherein the number N of the one or more second uplink sounding reference signal resources is an integer larger than or equal to 0.

The processor 800 is further configured to determine corresponding relations between each identifier in the identifiers of the one or more target uplink sounding reference signals and N second uplink sounding reference signal resources; select one or more second target uplink sounding reference signal resources corresponding to a first identifier in the identifiers of the one or more target uplink sounding reference signals from the N second uplink sounding reference signal resources, based on the corresponding relations; and transmit the one or more second target uplink sounding reference signal resources in a beam direction corresponding to the first identifier.

The processor 800 is further configured to receive corresponding-relation indication information transmitted by the network side, and based on the corresponding-relation indication information, determine corresponding relations between each identifier in the identifiers of the one or more target uplink sounding reference signals and the N second uplink sounding reference signal resources; or is configured to determine corresponding relations between each identifier in the identifiers of the one or more target uplink sounding reference signals and the N second uplink sounding reference signal resources based on a pre-agreement with the network side.

In the embodiments of the present disclosure, by indicating to the terminal the one or more first uplink sounding reference signal resources for uplink beam scanning and the one or more second uplink sounding reference signal resources for channel measurement, the terminal may transmit the one or more uplink sounding reference signals so that channel measurement may be performed to ensure normal communication between the terminal and the network side.

In several embodiments provided in the present disclosure, it should be understood that the disclosed method and device may be implemented in other ways. For example, the device embodiments described above are merely illustrative. For example, a division to units is only a logical function division and may be implemented in another division manner. For example, multiple units or components may be combined or integrated into another system, or some features may be ignored, or not be performed. Optionally, a coupling or a direct coupling or a communication connection shown or discussed between units displayed or discussed may be an indirect coupling or an indirect communication connection through some interfaces, devices or units, and may be electrical coupling or connections, mechanical coupling or connections, or other forms of coupling or connections.

In addition, various functional units in the embodiments of the present disclosure may be integrated in one processing unit, or may be separately physically included in multiple processing units, or two or more of the functional units may be integrated in one unit. The units may be realized either in the form of hardware or in the form of hardware function units plus software function units.

The units described above in the form of software functional units may be stored in a computer readable storage medium. The above-described software functional units are stored in a storage medium. The storage medium includes multiple instructions for causing a computer device (which may be a personal computer, a server, or a network device, etc.) to perform part of the steps of the method at a transmitting end or at the receiving end according to various embodiments of the present disclosure. The storage medium may be any of a variety of media, such as RAM, a Flash Memory, a mobile hard disk, a Read-Only Memory (ROM), a Random Access Memory (RAM), a magnetic disk, or a Compact Disk, that may store program codes.

The foregoing are optional embodiments of the present disclosure and it should be noted that various modifications and refinements may be made by those of ordinary skills in the art without departing from the principles of the present disclosure. These improvements and refinements should also be considered to be within the scope of the present disclosure.

What is claimed is:

1. A signal processing method, comprising:
   indicating a first uplink sounding reference signal resource to a terminal, wherein the first uplink sounding reference signal resource is used for uplink beam scanning;
   receiving an uplink sounding reference signal transmitted by the terminal by using the first uplink sounding reference signal resource;
   determining a target uplink sounding reference signal based on the uplink sounding reference signal transmitted by the terminal, and transmitting an identifier of the target uplink sounding reference signal to the terminal;
   indicating a second uplink sounding reference signal resource to the terminal, the second uplink sounding reference signal resource being used for the terminal to transmit an uplink sounding reference signal for channel measurement based on the identifier of the target uplink sounding reference signal and the second uplink sounding reference signal resource;
   wherein the method further comprises:
   transmitting corresponding-relation indication information to the terminal, wherein the corresponding-relation indication information comprises a corresponding relation between the second uplink sounding reference signal resource and the identifier of the target uplink sounding reference signal; or pre-agreeing the corresponding relation between the second uplink sounding reference signal resource and the identifier of the target uplink sounding reference signal with the terminal;

in a case that the corresponding relation is a corresponding relation between identifiers of N uplink sounding reference signals and P second uplink sounding reference signal resources, the corresponding relation is used to indicate to the terminal that uplink beams corresponding to identifiers of ones of N uplink sounding reference signals can be transmitted simultaneously; or in a case that the corresponding relation is a corresponding relation between identifiers of N uplink sounding reference signals and one second uplink sounding reference signal resource, the corresponding relation is used to indicate to the terminal that uplink beams corresponding to identifiers of the N uplink sounding reference signals can be transmitted simultaneously; or in a case that the corresponding relation is a corresponding relation between identifiers of N uplink sounding reference signals and N second uplink sounding reference signal resources, the corresponding relation is used to indicate to the terminal that uplink beams corresponding to identifiers of the N uplink sounding reference signals are not transmitted simultaneously.

2. The method according to claim 1, wherein the corresponding relation is a one-to-one correspondence, a one-to-many correspondence, a many-to-one correspondence, or a many-to-many correspondence.

3. The method according to claim 1, wherein the corresponding relation is a corresponding relation between identifiers of N uplink sounding reference signals and P second uplink sounding reference signal resources; or the corresponding relation is a corresponding relation between identifiers of N uplink sounding reference signals and one second uplink sounding reference signal resource; or the corresponding relation is a corresponding relation between identifiers of N uplink sounding reference signals and N second uplink sounding reference signal resources;

wherein, N and P are positive integers and N is not equal to P.

4. A base station, comprising a storage, a processor, and a transceiver, wherein, the processor is configured to read a program in the storage and execute steps in the method according to claim 1, wherein the transceiver is configured to receive and transmit data.

5. The base station according to claim 4, wherein, the corresponding relation is a one-to-one correspondence, a one-to-many correspondence, a many-to-one correspondence, or a many-to-many correspondence.

6. The base station according to claim 4, wherein, the corresponding relation is a corresponding relation between identifiers of N uplink sounding reference signals and P second uplink sounding reference signal resources; or the corresponding relation is a corresponding relation between identifiers of N uplink sounding reference signals and one second uplink sounding reference signal resource; or the corresponding relation is a corresponding relation between identifiers of N uplink sounding reference signals and N second uplink sounding reference signal resources;

wherein, N and P are positive integers and N is not equal to P.

7. A non-volatile computer readable storage medium, comprising:

a computer program stored on the non-volatile computer readable storage medium, wherein, when the computer program is executed by a processor, the processor implements steps in the method according to claim 1.

8. A signal processing method, comprising:

acquiring a first uplink sounding reference signal resource indicated by a network side, wherein the first uplink sounding reference signal resource is used for uplink beam scanning;

transmitting an uplink sounding reference signal to the network side by using the first uplink sounding reference signal resource;

receiving an identifier of a target uplink sounding reference signal transmitted by the network side;

acquiring a second uplink sounding reference signal resource indicated by the network side, and transmitting an uplink sounding reference signal for channel measurement based on the second uplink sounding reference signal resource and the identifier of the target uplink sounding reference signal;

the transmitting the uplink sounding reference signal for channel measurement based on the second uplink sounding reference signal resource and the identifier of the target uplink surrounding reference signal comprises:

receiving corresponding-relation indication information transmitted by the network side, and based on the corresponding-relation indication information, determining a corresponding relation between each identifier of the identifier of the target uplink sounding reference signal and P second uplink sounding reference signal resources; or determining a corresponding relation between each identifier of the identifier of the target uplink sounding reference signal and P second uplink sounding reference signal resources based on a pre-agreement with the network side;

transmitting the plink sounding reference signal by using one or more second xuplink sounding reference signal resources corresponding to the identifier of the target uplink sounding reference signal;

wherein P is a positive integer;

wherein in a case that the corresponding relation is the corresponding relation between identifiers of N uplink sounding reference signals and P second uplink sounding reference signal resources, the corresponding relation is used to indicate to the terminal that uplink beams corresponding to identifiers of ones of N uplink sounding reference signals are transmitted simultaneously; or in a case that the corresponding relation is the corresponding relation between identifiers of N uplink sounding reference signals and one second uplink sounding reference signal resource, the corresponding relation is used to indicate to the terminal that uplink beams corresponding to identifiers of the N uplink sounding reference signals are transmitted simultaneously; or in a case that the corresponding relation is the corresponding relation between identifiers of N uplink sounding reference signals and N second uplink sounding reference signal resources, the corresponding relation is used to indicate to the terminal that uplink beams corresponding to identifiers of the N uplink sounding reference signals are not transmitted simultaneously.

9. The method according to claim 8, wherein the corresponding relation is a one-to-one correspondence, a one-to-many correspondence, a many-to-one correspondence, or a many-to-many correspondence.

10. The method according to claim 8, wherein
the corresponding relation is a corresponding relation between identifiers of N uplink sounding reference signals and P second uplink sounding reference signal resources; or
the corresponding relation is a corresponding relation between identifiers of N uplink sounding reference signals and one second uplink sounding reference signal resource; or
the corresponding relation is a corresponding relation between identifiers of N uplink sounding reference signals and N second uplink sounding reference signal resources;
wherein, N and P are positive integers and N is not equal to P.

11. A terminal, comprising a storage, a processor, and a transceiver, wherein, the processor is configured to read a program in the storage and execute steps in the method according to claim 7,
wherein the transceiver is configured to receive and transmit data.

12. The terminal according to claim 11, wherein, the corresponding relation is a one-to-one correspondence, a one-to-many correspondence, a many-to-one correspondence, or a many-to-many correspondence.

13. The terminal according to claim 11, wherein
the corresponding relation is a corresponding relation between identifiers of N uplink sounding reference signals and P second uplink sounding reference signal resources; or
the corresponding relation is a corresponding relation between identifiers of N uplink sounding reference signals and one second uplink sounding reference signal resource; or
the corresponding relation is a corresponding relation between identifiers of N uplink sounding reference signals and N second uplink sounding reference signal resources;
wherein, N and P are positive integers and N is not equal to P.

14. A non-volatile computer readable storage medium, comprising:
a computer program stored on the non-volatile computer readable storage medium, wherein, when the computer program is executed by a processor, the processor implements steps in the method according to claim 8.

* * * * *